United States Patent
Smith et al.

(10) Patent No.: US 11,275,174 B2
(45) Date of Patent: Mar. 15, 2022

(54) METHODS AND SYSTEMS FOR REDUCING VEHICLE SENSOR INTERFERENCE

(71) Applicant: Waymo LLC, Mountain View, CA (US)

(72) Inventors: Larry Smith, Mountain View, CA (US); Filip Perich, Mountain View, CA (US); Timothy Campbell, Mountain View, CA (US); Michael Marx, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 243 days.

(21) Appl. No.: 16/554,500

(22) Filed: Aug. 28, 2019

(65) Prior Publication Data

US 2021/0063566 A1 Mar. 4, 2021

(51) Int. Cl.
*G01S 13/931* (2020.01)
*G01S 7/02* (2006.01)
*G06K 9/00* (2006.01)
*G01S 13/00* (2006.01)

(52) U.S. Cl.
CPC ............ *G01S 13/931* (2013.01); *G01S 7/023* (2013.01); *G06K 9/00805* (2013.01); *G01S 2013/932* (2020.01); *G01S 2013/9316* (2020.01)

(58) Field of Classification Search
None
See application file for complete search history.

(56) References Cited

U.S. PATENT DOCUMENTS

| | | | | |
|---|---|---|---|---|
| 5,181,038 A * | 1/1993 | Asbury | ................. | G01S 13/931 342/70 |
| 5,274,380 A * | 12/1993 | Yatsuka | ................. | G01S 13/931 342/70 |
| 5,280,288 A * | 1/1994 | Sherry | ................. | G01S 13/931 342/83 |
| 5,497,162 A * | 3/1996 | Kaiser | .................... | G01S 7/023 342/147 |
| 5,923,280 A * | 7/1999 | Farmer | .................... | G01S 7/023 342/70 |
| 9,355,561 B2 * | 5/2016 | Rubin | .................... | G08G 1/163 |

(Continued)

OTHER PUBLICATIONS

International Search Report and Written Opinion for corresponding PCT application No. PCT/US2020/043013, dated Nov. 5, 2020.

*Primary Examiner* — Bernarr E Gregory
(74) *Attorney, Agent, or Firm* — McDonnell Boehnen Hulbert & Berghoff LLP

(57) ABSTRACT

A method is provided that includes a vehicle receiving data from an external computing device indicative of at least one other vehicle in an environment of the vehicle. The vehicle may include a sensor configured to detect the environment of the vehicle. The at least one other vehicle may include at least one sensor. The method also includes determining a likelihood of interference between the at least one sensor of the at least one other vehicle and the sensor of the vehicle. The method also includes initiating an adjustment of the sensor to reduce the likelihood of interference between the sensor of the vehicle and the at least one sensor of the at least one other vehicle responsive to the determination.

20 Claims, 10 Drawing Sheets

(56) References Cited

U.S. PATENT DOCUMENTS

| | | |
|---|---|---|
| 2008/0106458 A1* | 5/2008 | Honda .................. G01S 13/931 342/59 |
| 2008/0231497 A1 | 9/2008 | Sakamoto |
| 2015/0168546 A1 | 6/2015 | Nakagawa et al. |
| 2016/0061935 A1* | 3/2016 | McCloskey ........... G01S 7/4008 342/82 |
| 2017/0293016 A1 | 10/2017 | McCloskey et al. |
| 2019/0094333 A1 | 3/2019 | Va et al. |
| 2019/0187247 A1 | 6/2019 | Izadian et al. |
| 2019/0293748 A1* | 9/2019 | Gulati ................... G01S 7/4004 |
| 2019/0391247 A1* | 12/2019 | Gulati ................... G01S 13/931 |

* cited by examiner

METHODS AND SYSTEMS FOR REDUCING VEHICLE SENSOR INTERFERENCE

BACKGROUND

Radio detection and ranging (RADAR) systems can be used to actively estimate range, angle, and/or Doppler frequency shift to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

In some examples, directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. In other examples, non-directional antennas can be alternatively used. In these examples, a receiving antenna may have a 90 degree field of view, and may be configured to utilize multiple channels with a phase offset to determine angle of arrival of the received signal. Thus, the radar sensor can be used, for instance, by an autonomous vehicle control system to avoid obstacles indicated by the sensor information. Some example automotive radar systems may be configured to operate at an electromagnetic wave frequency range of 76-77 Giga-Hertz (GHz). These radar systems may use transmission antennas that can to focus the radiated energy into tight beams in order to enable receiving antennas (e.g., having wide angle beams) in the radar system to measure an environment of the vehicle with high accuracy.

SUMMARY

In one example, a radar planning system is provided. The radar planning system includes a communication interface configured to communicate with a plurality of vehicles. The radar planning system also includes a memory configured to store data related to the plurality of vehicles, where the data includes vehicle position data. Additionally, the radar planning system includes a processing system configured to determine potential radar interference between at least two radar units associated with at least one vehicle in communication with the radar planning system. The processing system is further configured to determine radar channel assignments for the at least two radar units. Additionally, the processing system is configured to provide the determined radar channel assignments to the at least one vehicle in communication with the radar planning system.

In another example, a method is provided that includes determining potential radar interference between at least two radar units associated with at least one vehicle of a plurality of vehicles in communication with a radar planning system by way of a communication interface. The method also includes determining radar channel assignments for the at least two radar units. Additionally, the method includes providing the determined radar channel assignments to the at least one vehicle in communication with the radar planning system.

In yet another example, a non-transitory computer readable medium having stored thereon executable instructions that, upon execution by a computing device, cause the computing device to perform functions is provided. The functions include determining potential radar interference between at least two radar units associated with at least one vehicle of a plurality of vehicles in communication with a radar planning system by way of a communication interface. The functions further include determining radar channel assignments for the at least two radar units. Additionally, the functions include providing the determined radar channel assignments to the at least one vehicle in communication with the radar planning system.

In still another example, a system is provided that includes a means for determining potential radar interference between at least two radar units associated with at least one vehicle of a plurality of vehicles in communication with a radar planning system by way of a communication interface. The system also includes means for determining radar channel assignments for the at least two radar units. Additionally, the system includes means for providing the determined radar channel assignments to the at least one vehicle in communication with the radar planning system.

These as well as other aspects, advantages, and alternatives, will become apparent to those of ordinary skill in the art by reading the following detailed description, with reference where appropriate to the accompanying figures.

DETAILED DESCRIPTION

Figure 1:
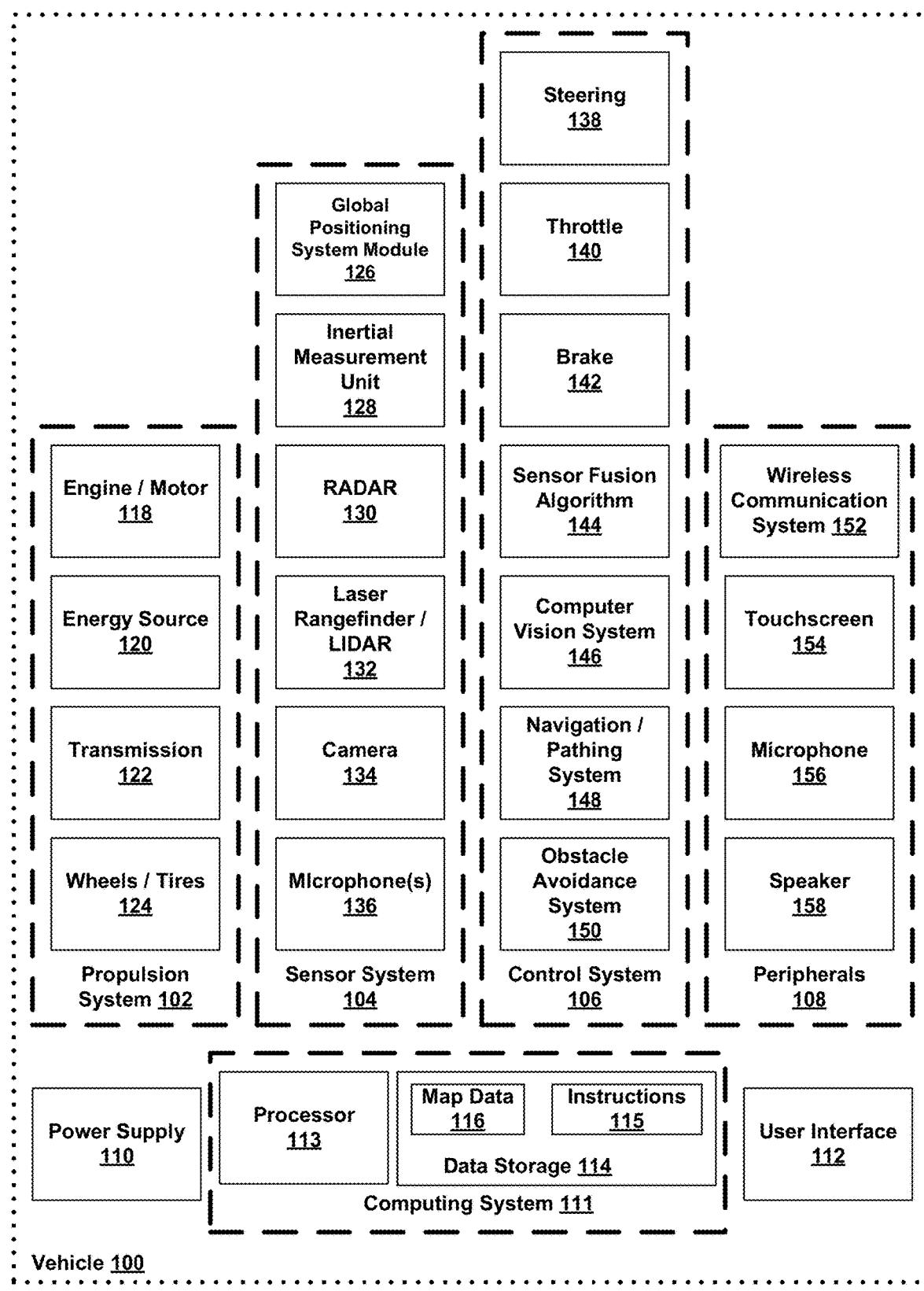
FIG. 1 is a functional block diagram depicting aspects of an example autonomous vehicle.

The following detailed description describes various features and functions of the disclosed systems and methods with reference to the accompanying figures. In the figures, similar symbols identify similar components, unless the context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

Continued efforts to improve vehicle safety include the development of autonomous vehicles equipped with accident-avoidance systems that may have the ability to avoid accidents. Various sensors, such as radio detection and ranging (RADAR) sensors and light detection and ranging (LIDAR) sensors among other possibilities, may be included in an autonomous vehicle to detect obstacles and/or other vehicles in an environment of the autonomous vehicle and thereby facilitate accident avoidance. However, as more vehicles adopt such accident-avoidance systems and the density of sensor equipped vehicles increases, interference may arise between the sensors that can reduce accuracy and the effectiveness of using the sensors for accident avoidance.

Within examples, systems and methods described herein may be configured to adjust a sensor of a vehicle to reduce the likelihood of interference between the sensor and other sensors in the environment, such as another sensor of the vehicle or a sensor of another vehicle. By way of example, a vehicle herein may comprise at least one sensor configured to detect an environment of the vehicle. The vehicle may further comprise a controller configured to receive data from an external computing device indicative of at least one other sensor in the environment of the vehicle. The external computing device, for example, may be a server capable of engaging in wireless communication with the vehicle and other vehicles in the environment.

In one instance, the controller may also be configured to determine that the at least one sensor may potentially interfere with the sensor of another vehicle based on the data. In another instance, the controller may be configured to determine that the vehicle and at least one other vehicle are within a threshold distance to each other, thus increasing the likelihood of interference. As a result, for example, the data may include locations of the at least one other vehicle and/or directions of the at least one sensor. The controller may also be configured to responsively initiate an adjustment of the sensor to reduce the likelihood of interference between the sensor of the vehicle and the at least one sensor of the at least one other vehicle.

Various adjustments of the sensor are possible, such as adjusting a channel assignment, a direction, power, modulation pattern, or any other parameter of the sensor to reduce interference with the at least one sensor of the at least one other vehicle. In practice, the external computing device may assign radar channels to the sensors of various vehicles to mitigate potential interference between the various sensors. For example, the external computing device may be able to determine the location, orientation, and range for different sensors of different vehicles. The external computing device may responsively determine channel assignments for the various sensors in order to prevent two sensors from interfering with each other. Interference may be caused by two sensors operating on the same or adjacent channels within each other sensor's range.

Alternatively, in some examples, the external computing device may receive configuration parameters of the sensors of the vehicle and other sensors of other vehicles in the vicinity of the vehicle. In these examples, the external computing device may provide instructions to the vehicle and/or the other vehicles with suitable adjustments for corresponding sensors to reduce the interference between the various sensors. Therefore, in some embodiments, some of the functions described above for the vehicle may be alternatively performed by the external computing device in accordance with various conditions, such as network latency between the external computing device and the vehicle or other safety considerations.

Additionally, the external computing device may be configured to determine a plurality of sets of channel assignments. The sets of channel assignments determined by the computing device may include a sequence of channels, channel parameters, and associated timing information. The sets of channel assignments may be determined in advance, without any input or determinations based on the vehicles. The sets of channel assignments may be determined in a way to minimize potential channel interference between two vehicles if two vehicles are each assigned a different channel assignment of the sets of channel assignments.

Each channel assignment of the sets of channel assignments may be a combination of channel and timing information. These combinations of channel and timing information may be predetermined and stored in a memory of the system. As an example, a system may determine 40 different combinations of channels and timing. Each of the 40 combinations may be designed to minimize interference with each other of the combination.

In practice, a radar unit may transmit and receive on a given frequency channel for a predetermined period of time, such as 150 milliseconds. Based on the given channel assigned to a radar unit, after each 150 millisecond period, the radar unit may begin transmitting on another channel, as specified by its channel assignment. Thus, for a given block of time, the radar until may sequentially transmit on different channels, as specified by the channel assignment. As one example, the predetermined block of time may be 6 seconds. Thus, over the six-second block, the radar may make 40 transmissions, each of which on a channel specified by the channel assignment. The system may provide another channel assignment for the next block, or the radar may operate with the same channel assignment in a subsequent block. The numerical values provided here are some examples, a block may be longer or shorter than 6 seconds and the time a radar may transmit and receive on a given channel may be larger or smaller than 150 milliseconds.

Thus, during the operation of a plurality of radar units, the system may assign each radar unit its own respective channel assignment. It may be desirable for the sequence of channels and the timing of each channel within a given channel assignment be sufficiently different than that assigned to a radar unit that is potentially interfering. For example, the system may set a threshold number of channel collisions that can occur between two radar units' channel assignments over a given block of time. In some examples, this threshold may be zero collisions, one collision, or a different number of collisions. The radar system may be able to tolerate a small amount of channel interference because the amount of interference due to another radar may be equal to (or less than) the collision maximum that is specified.

Additionally, in some examples, there may be another threshold measurement based on the number of times potentially interfering radar units are on adjacent channels. Thus, the system may also assign channels to minimize the number of times two radar units are on adjacent channels over a given block of time.

Additionally, in some examples, radar units may be located in positions that are not on a vehicle. For example, a radar unit may be located on a fixed structure, such as to monitor a roadway or intersection of a roadway. These non-vehicular radar units may also be in communication with the external computing device. Therefore, the present disclosure may also enable interference mitigation between vehicle-mounted radar and non-vehicle-mounted radar units.

The embodiments disclosed herein may be used on any type of vehicle, including conventional automobiles and automobiles having an autonomous mode of operation. However, the term "vehicle" is to be broadly construed to cover any moving object, including, for instance, a truck, a van, a semitrailer truck, a motorcycle, a golf cart, an off-road vehicle, a warehouse transport vehicle, or a farm vehicle, as well as a carrier that rides on a track such as a rollercoaster, trolley, tram, or train car, among other examples. Furthermore, although example vehicles are shown and described as vehicles that may be configured to operate in autonomous mode, the embodiments described herein are also applicable to vehicles that are not configured to operate autonomously. Thus, the example vehicles are not meant to limit the present disclosure to autonomous vehicles.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104 and can base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode (i.e., controlled by a driver) and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments, the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., O2 monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as Code-Division Multiple Access (CDMA), Evolution-Data Optimized (EV-DO), Global System for Mobile communications (GSM)/General Packet Radio Surface (GPRS), and/or 4G cellular communication, such as Worldwide Interoperability for Microwave Access (WiMAX) or Long-Term Evolution (LTE). Additionally or alternatively, wireless communication system 146 can communicate with a wireless local area network (WLAN), for example, using WiFi. In some embodiments, wireless communication system 146 could communicate directly with a device, for example, using an infrared link, Bluetooth®, and/or Zig-Bee®. The wireless communication system 146 can include one or more dedicated short-range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals 108, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2A:
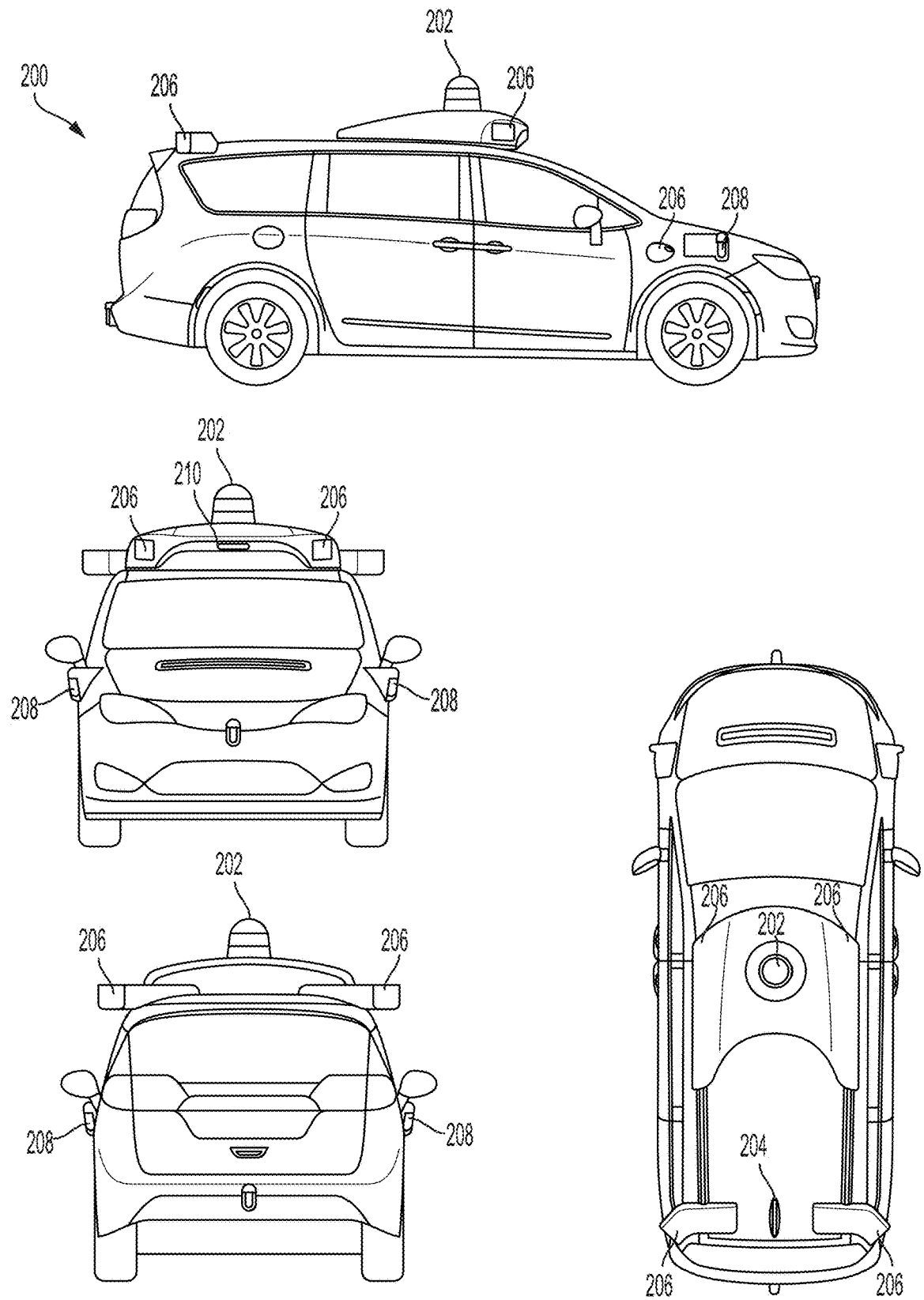
FIG. 2A depicts exterior views of an example autonomous vehicle.

FIG. 2A shows an example vehicle 200 that can include some or all of the functions described in connection with vehicle 100 in reference to FIG. 1. In particular, FIG. 2A shows various different views of vehicle 200. Although vehicle 200 is illustrated in FIG. 2A as a four-wheel van-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, RADAR units 206, laser rangefinder units 208, and a camera 210. Furthermore, the example vehicle 200 can include any of the components described in connection with vehicle 100 of FIG. 1. The RADAR unit 206 and/or laser rangefinder unit 208 can actively scan the surrounding environment for the presence of potential obstacles and can be similar to the RADAR unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include RADAR unit 206 and laser rangefinder unit 208. Furthermore, each sensor of sensor unit 202 can be configured to be moved or scanned independently of other sensors of sensor unit 202.

In an example configuration, one or more RADAR scanners (e.g., the RADAR unit 206) can be located near the front of the vehicle 200, to actively scan the region in front of the car 200 for the presence of radio-reflective objects. A RADAR scanner can be situated, for example, in a location suitable to illuminate a region including a forward-moving path of the vehicle 200 without occlusion by other features of the vehicle 200. For example, a RADAR scanner can be situated to be embedded and/or mounted in or near the front bumper, front headlights, cowl, and/or hood, etc. Furthermore, one or more additional RADAR scanning devices can be located to actively scan the side and/or rear of the vehicle 200 for the presence of radio-reflective objects, such as by including such devices in or near the rear bumper, side panels, rocker panels, and/or undercarriage, etc.

The wireless communication system 204 could be located on the roof of the vehicle 200 as depicted in FIG. 2A. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc. that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200. Further, the camera 210 can have associated optics operable to provide an adjustable field of view. Further, the camera 210 can be mounted to vehicle 200 with a movable mount to vary a pointing angle of the camera 210, such as via a pan/tilt mechanism.

Figure 2B:
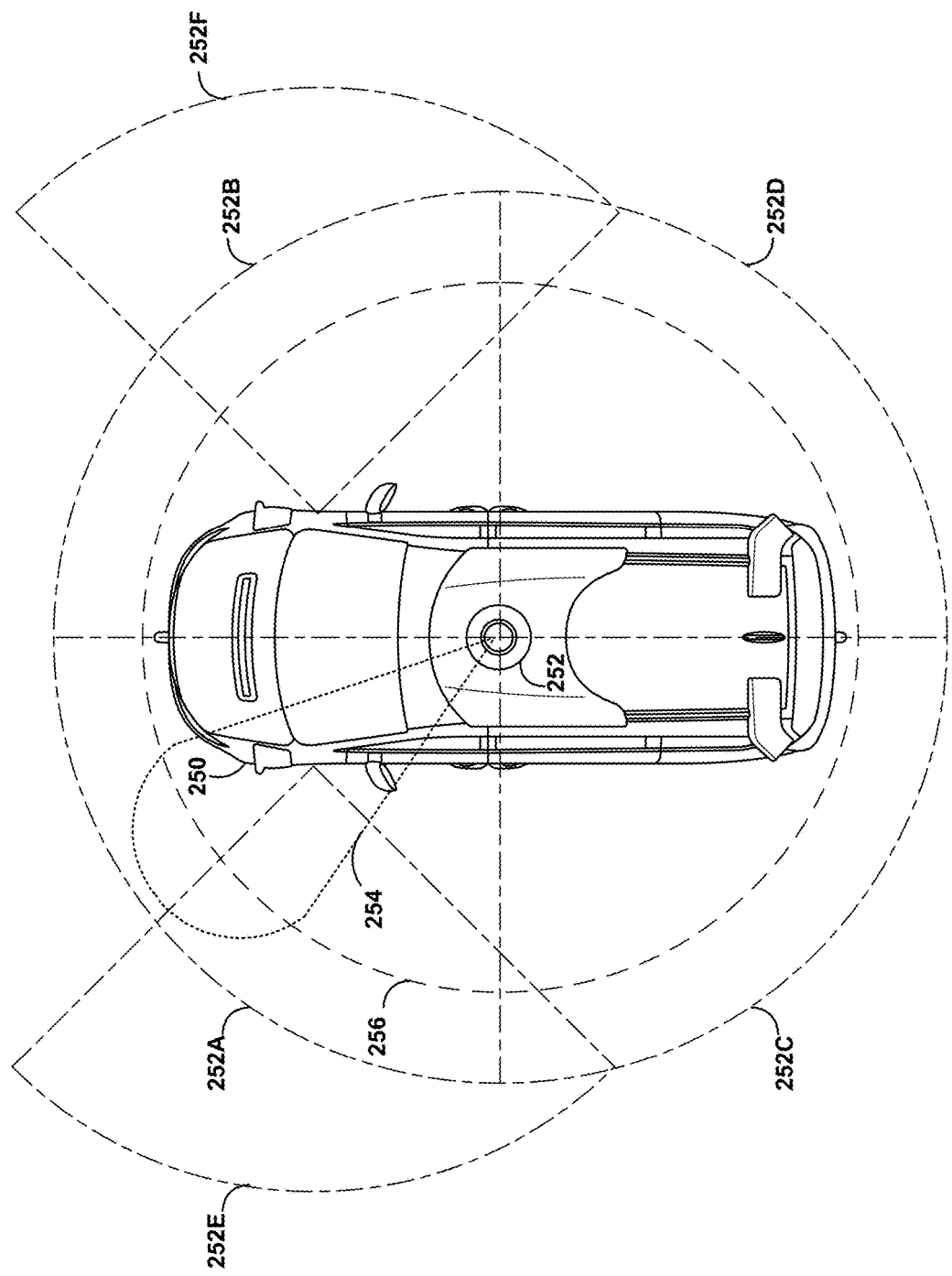
FIG. 2B depicts sensor fields of view of an example autonomous vehicle.

FIG. 2B illustrates an example autonomous vehicle 250 having various sensor fields of view. As previously discussed with respect to FIG. 2A, the vehicle 250 may contain a plurality of sensors. The locations of the various sensors may correspond to the locations of the sensors disclosed in FIG. 2A. However, in some instances, the sensors may have other locations. Sensors locations are omitted from FIG. 2B for simplicity of the drawing. For each sensor unit of vehicle 250, FIG. 2B shows a respective field of view. The field of view of a sensor may include an angular region over which the sensor may detect objects and a range that corresponds to maximum distance from the sensor at which the sensor may reliable detect objects.

The vehicle 250 may include six radar units. A first radar unit may be located on the front-left of the vehicle and have an angular field of view corresponding to the angular portion of field of view 252A. A second radar unit may be located on the front-right of the vehicle and have an angular field of view corresponding to the angular portion of field of view 252B. A third radar unit may be located on the rear-left of the vehicle and have an angular field of view corresponding to the angular portion of field of view 252C. A fourth radar unit may be located on the rear-right of the vehicle and have an angular field of view corresponding to the angular portion of field of view 252D. A fifth radar unit may be located on the left side of the vehicle and have an angular field of view corresponding to the angular portion of field of view 252E. A sixth radar unit may be located on the right side of the vehicle and have an angular field of view corresponding to the angular portion of field of view 252F. Each of the six radar units may be configured with a scannable beamwidth of 90 degrees. A radar beamwidth may be smaller than 90 degrees, but each radar unit may be able to steer the radar beam across the 90-degree field of view.

A first LIDAR unit of the vehicle 250 may be configured to scan the full 360-degree region around the vehicle as shown by an angular field of view corresponding to the angular portion of field of view 254. A second LIDAR unit of the vehicle 250 may be configured to scan a region smaller than the 360-degree region around the vehicle. In one example, the second LIDAR unit may have a field of view smaller than 10 degrees in the horizontal plant as shown by an angular field of view corresponding to the angular portion of field of view 254.

Additionally, the vehicle may also include at least one camera. The camera may be an optical camera and/or an infrared camera.

In addition to the field of view for each of the various sensors of vehicle 250, each sensor may also have a corresponding range. In one example, the range of the radar units may be greater than the range of either LIDAR unit, as shown by the field of the views of the radar units 252A-252E extending further than the fields of view for the LIDAR units 254 and 256. Additionally, the second LIDAR unit may have a range that is greater than a range of the first LIDAR unit, as shown by field of view 256 extending further than field of view 254. In various examples, the range of the camera may be greater than or less than the range of the other sensors.

Figure 3:
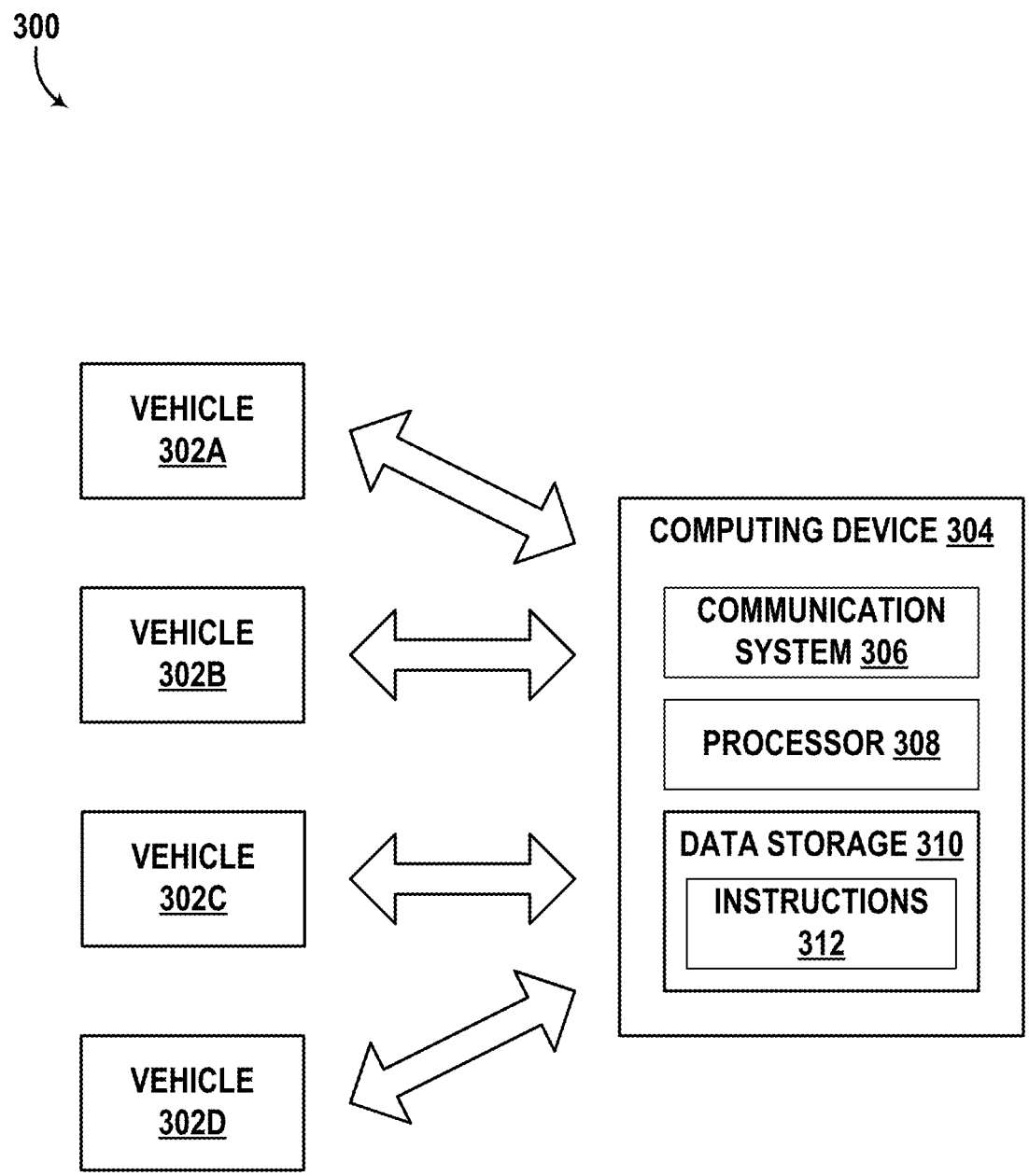
FIG. 3 is a simplified block diagram of a system, according to an example embodiment.

FIG. 3 is a simplified block diagram of a system 300, according to an example embodiment. The system 300 includes vehicles 302A-302D communicatively linked (e.g., via wired and/or wireless interfaces) to an external computing device 304. The vehicles 302A-302D and the computing device 304 may communicate within a network. Alternatively, the vehicles 302A-302D and the computing device 304 may each reside within a respective network.

The vehicles 302a-302d may be similar to the vehicles 100-200. For example, the vehicles 302a-302d may be partially or fully autonomous vehicles that each include a sensor (e.g., RADAR, etc.) to detect an environment of the vehicles 302A-302D. The vehicles 302A-302D may include components not shown in FIG. 3, such as a user interface, a communication interface, a processor, and data storage comprising instructions executable by the processor for carrying out one or more functions relating to the data sent to, or received by, the computing device 304. Further, the functions may also relate to control of the vehicles 302A-302D or components thereof, such as sensors, etc. To that end, the functions may also include methods and systems described herein.

The computing device 304 may be configured as a server or any other entity arranged to carry out the functions described herein. Further, the computing device 304 may be configured to send data/requests to the vehicles 302A-302D and/or to receive data from the vehicles 302A-302D. For example, the computing device 304 may receive location information from the vehicles 302A-302D as well as sensor configurations (e.g., direction, modulation pattern, etc.), and may responsively provide requests to proximate vehicles to adjust the corresponding sensor configurations (e.g., radar channel assignments) to reduce interference between the corresponding sensors. Additionally or alternatively, for example, the computing device 304 may function as a medium for sharing the data (e.g., sensor configurations, locations, etc.) between the vehicles 302A-302D. Although FIG. 3 shows that the vehicles 302A-302D communicate via the computing device 304, in some examples, the vehicles 302A-302D may additionally or alternatively communicate directly with one another.

The computing device 304 includes a communication system 306, a processor 308, and data storage 310. The communication system 306 may be any system configured to communicate with the vehicles 302A-302D, or other entities, either directly or via a communication network, such as a wireless communication network. For example, the communication system 306 may include an antenna and a chipset for wirelessly communicating with the vehicles 302A-302D, servers, or other entities either directly or via a wireless communication network. Alternatively, in some examples, the communication system 306 may include a wired connection to a server or other entity in wireless communication with the vehicles 302A-302D. Accordingly, the chipset or the communication system 306 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, LTE, or 5th generation "5G" cellular), Zigbee, dedicated short range communications (DSRC), and radio frequency identification (RFID) communications, among other possibilities, or one or more types of wired communication such as Local Area Network (LAN), etc. The communication system 306 may take other forms as well.

The processor 308 may comprise one or more general-purpose processors and/or one or more special-purpose processors. To the extent the processor 308 includes more than one processor, such processors could work separately or in combination. Data storage 310, in turn, may comprise one or more volatile and/or one or more non-volatile storage components, such as optical, magnetic, and/or organic storage, and data storage 310 may be integrated in whole or in part with the processor 308.

In some embodiments, data storage 310 may contain instructions 312 (e.g., program logic) executable by the processor 308 to execute various functions described herein. Data storage 310 may contain additional instructions as well, including instructions to transmit data to, receive data from, interact with, and/or control one or more of the vehicles 302A-302D. The data storage may also include data related to the location of vehicles 302A-302D as well as sensor locations and sensor fields of view for vehicles 302A-302D. The computer system 210 may additionally or alternatively include components other than those shown.

Figure 4:
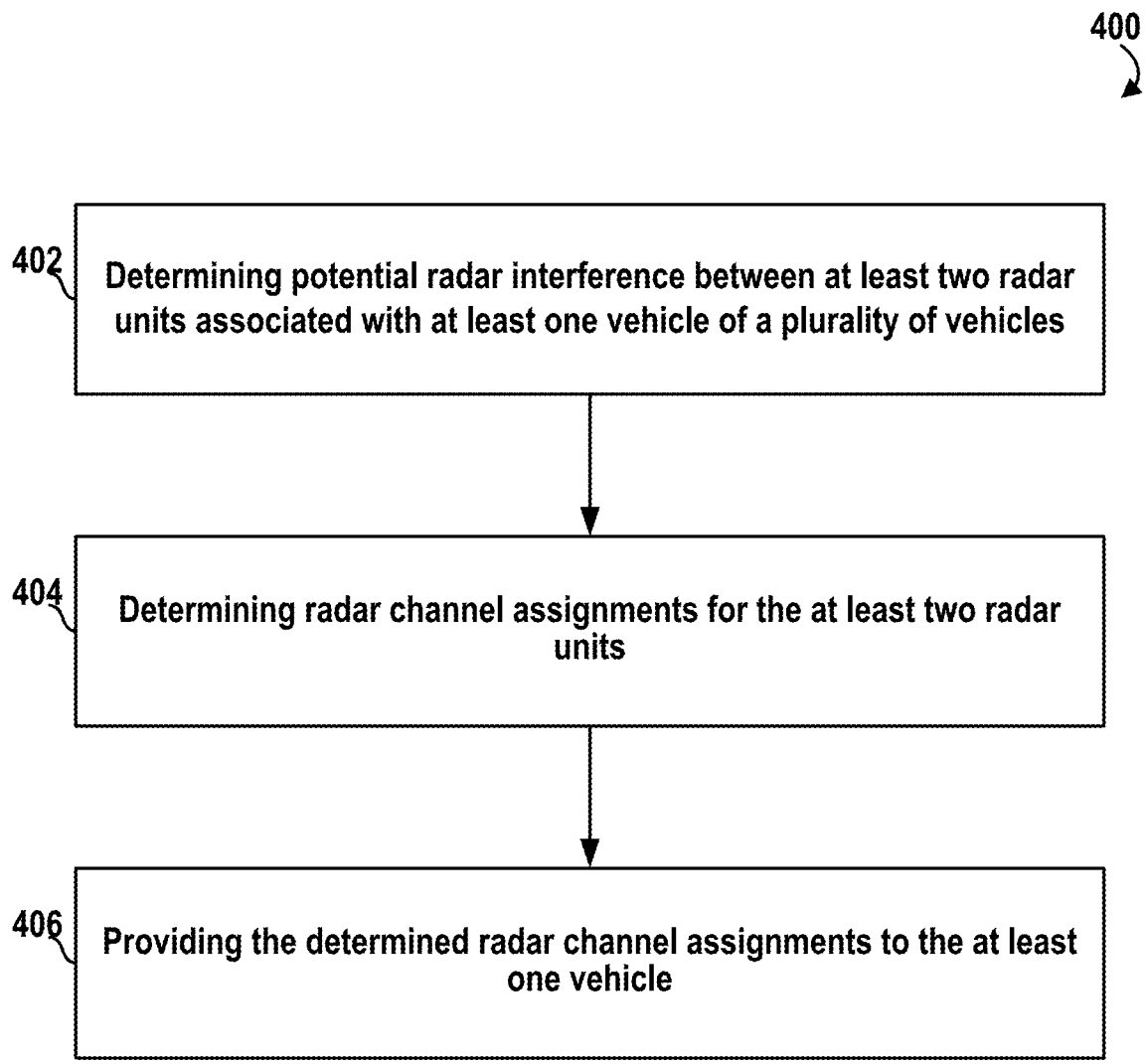
FIG. 4 is a block diagram of a method, according to an example embodiment.

FIG. 4 is a block diagram of a method 400, according to an example embodiment. Method 400 shown in FIG. 4 presents an embodiment of a method that could be used with the vehicles 100, 200, 250, 302a-302d, or the computing device 304, for example. Method 400 may include one or more operations, functions, or actions as illustrated by one or more of blocks 402-406. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process, for example.

The method 400 may describe a method for reducing a likelihood of interference between a sensor of a vehicle and other sensors. The term channel as used throughout method 400 may refer to a single radio channel over one time period or may refer to a plurality of predetermined channel assignments from a set of channel assignments as previously discussed.

At block 402, the method 400 includes determining potential radar interference between at least two radar units associated with at least one vehicle of a plurality of vehicles. Additionally, at block 400, the plurality of vehicles are in communication with a radar planning system by way of a communication interface. In some examples, the radar planning system may also receive location data from at least one vehicle of the plurality of vehicles and store the location data in a memory. Moreover, the memory may also contain information for the at least one vehicle of the plurality of vehicles related to sensor locations and/or sensor fields of view for the sensors of the at least one vehicle of a plurality of vehicles.

Based on information related to the at least one vehicle of the plurality of vehicles, the system may determine potential interference between at least two radar units. In some examples, the two radar units may be located on one vehicle of the plurality of vehicles. In some other examples, the two radar units may be located on two different vehicles of the plurality of vehicles.

To facilitate the determination at block 402, in some examples, the vehicle may include a location sensor similar to the GPS 226 of the vehicle 200 or any other location sensor. In these examples, the method 400 may perform the determination at block 402 based on a comparison between location of the at least one other vehicle (e.g., indicated by the data) and location of the vehicle (e.g., indicated by the location sensor). Additionally, the vehicle may include an orientation sensor similar to the IMU 228 of the vehicle 200. For example, the orientation sensor may be utilized to determine an orientation and/or heading of the vehicle to facilitate determining the likelihood of interference at block 404. For example, the vehicle may compare the orientation with orientations of the at least one other vehicle (and sensors thereon) to determine the likelihood of interference. Similarly, for example, the location of the vehicle may be compared with locations of the at least one other vehicle. Other examples are possible as well. The location information from the vehicle(s) may be communicated to the radar planning system at block 402.

Accordingly, in some examples, the method 400 may also include identifying the location of the vehicle in the environment based on a location sensor in the vehicle. In these examples, the method 400 may also include determining that the at least one other vehicle is within a threshold distance to the vehicle based on the location from the location sensor and the data from the radar planning system. The radar planning system may use the location data provided from the at least one vehicle and a processor to determine potential interference. The processor may be able to compare the location of the vehicle with information from a map. The map information may be stored in a memory of the radar planning system or retrieved over a network.

In some examples, the processor may determine two radar units may interfere with each other when the two radar units are located within each other's field of view. In other examples, the processor may determine two radar units may interfere with each other when an object identified on the map may reflect radar signals from one radar unit into the field of view of a second radar unit. In other examples, various other criteria may be used to determine when two radar units may interfere with each other.

At block 404, the method 400 includes determining radar channel assignments for the at least two radar units. In practice, when a radar unit operates it may transmit a signal on a channel. The channel may specify various parameters for the signal transmitted by the radar unit. For example, a channel may specify frequency and timing parameters for a signal transmitted by the radar unit. Thus, when two radar units are transmitted on two different channels, the signals may be transmitted on different frequencies (and/or at different times) from other transmitted signals. Moreover, signals transmitted on different channels received separately from each other by the respective radar unit(s) that transmitted the signals.

Additionally, if a radar unit receives reflected radar signals on two different channels, it may be able to filter out the desired radar reflection signal from the undesired radar reflection signal. By filtering the undesired signal, interference may be reduced and signal to noise ratio of the desired radar signal may be improved.

By way of example, the channel may also specify a modulation pattern of the transmitted signal. In some examples, the transmitted signal may be a linearly frequency modulated (LFM) RADAR modulation, where the frequency of the EM radiation is adjusted over time in accordance with the modulation pattern. A receiver of the sensor (e.g., RADAR receiver) may filter received signals based on the modulation pattern of the transmitted signal. Thus, signals received with a different modulation pattern may be removed.

In another example, different channels may also comprise adjusting the modulation pattern by applying an offset, among the other possibilities, to distinguish one channel from another based on the respective modulation patterns. In this example, the offset may be a frequency offset or a time offset. In another example, the vehicle may adjust the modulation pattern by adjusting a frequency bandwidth or a shape of the modulation pattern. In yet another example, the vehicle may adjust the modulation pattern by applying a particular phase-shift keying (PSK) modulation scheme to the signal transmitted by the sensor, and the receiver may filter the incoming signal based on the particular PSK scheme (e.g., to distinguish the signal transmitted by the sensor from other signal transmitted by other sensors of other vehicles). PSK is a digital modulation scheme that conveys data by changing, or modulating, a phase of the transmitted EM radiation. For example, the transmitted signal may be conditioned to have a finite number of phases, each assigned a unique pattern of binary digits, and the pattern of binary digits may be detected at a digital signal processor coupled to the receiver of the sensor to identify the source of the signal. Various PSK schemes are possible such as Binary phase-shift keying (BPSK), Quadrature phase-shift keying (QPSK), High-order PSK, Differential phase-shift keying (DPSK), etc.

In some examples, two radar units may interfere with each other when one radar unit is within the field of view of a second radar unit and both are operating on the same channel. Moreover, in some instances, two radar units may interfere with each other when one radar unit is within the field of view of a second radar unit and both are operating on adjacent channels. Additionally, radar units may interfere with each other when they are outside of the field of view from one another, but radar reflections from one radar unit reflect into the field of view of the other radar unit.

In some additional examples, the radar planning system may also assign a power for the transmission of radar signals, along with a channel assignment. For example, the data may indicate that the at least one other vehicle is at a given distance from the vehicle. In this example, the vehicle (and/or the at least one other vehicle) may be operated by the method 400 to reduce the power of the signal transmitted by the sensor (and/or the at least one sensor of the at least one other vehicle) to reduce the interference. For example, the radar planning system may provide a request to the vehicle and/or the at least one other vehicle to modify the power of corresponding signal transmitted by each vehicle to reduce the interference. Accordingly, in some examples, the method 400 may also include modifying a power of the signal transmitted by the sensor.

Moreover, as previously discussed, the processor may have determined sets of channel assignments in advance (for example as part of either block 402 or 404, or before block 402). During the operation of the system, the processor may assign channels to the respective sensors from the sets of predetermined channels. The predetermined channels may be specified based on various channel and timing parameters. This information about the various channels may be stored in a memory of the system. When assigning channels to a respective sensor, the system may communicate the data about the given channel to the vehicle or object to which the sensor is coupled so that the sensor may operate according to its assigned channel.

Further, in some embodiments, the vehicle may include a velocity sensor similar to the GPS 226 and/or the IMU 228 of the vehicle 200 or any other velocity sensor. In these embodiments, the velocity sensor may be configured to detect a direction of travel and/or a speed of the vehicle. In one example, if the direction of travel is towards the at least one other vehicle, the method 400 may optionally include the radar planning system determining an increased likelihood of interference and communicating an instruction to one or more of the vehicles to reduce the power of the signal based on the determination. Additionally, the radar planning system may communicate an instruction to one or more of the vehicles to increase the power of the signal based on a determination that interference is less likely.

Figure 5:
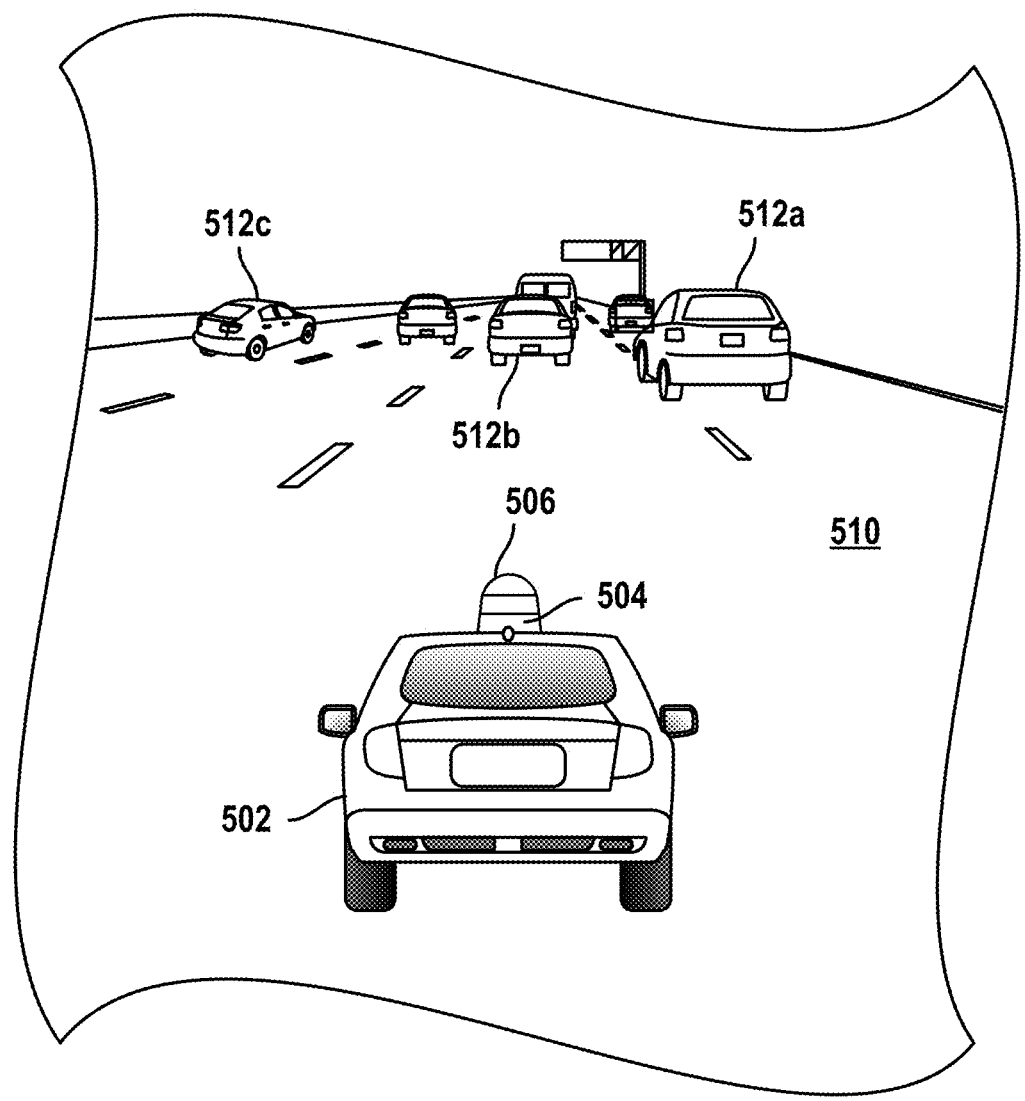
FIG. 5 illustrates a plurality of vehicles within an environment of a vehicle that includes a sensor, according to an example embodiment.

FIG. 5 illustrates a plurality of vehicles 512a-512c within an environment of a vehicle 502 that includes a sensor 506, according to an example embodiment. Although sensor 506 is shown on the roof of vehicle 502, it should be understood that sensor 506 may be located in the location(s) described with respect to FIG. 2B and have a field of view similar to that described with respect to FIG. 2B.

The vehicles 502 and 512a-c may be similar to the vehicles 100, 200, 302a-302d of FIGS. 1-3. For example, the vehicle 502 may include the sensor 506 (e.g., RADAR, LIDAR, etc.) similar to the radar unit 206 and/or the lidar unit 202 or 208 of the vehicle 200. Further, the vehicle 502 includes a mount 504 ("steering device") configured to adjust a direction of the sensor 506. The mount 504, for example, may be a moveable mount comprising materials suitable for supporting the sensor 506 and may be operated by a control system (not shown) to rotate the sensor 506 about a mount axis to modify the direction of the sensor 506. Alternatively, the mount 504 may modify the direction of the sensor 506 in a different manner. For example, the mount 504 (e.g., steering device) may translate the sensor 506 along a horizontal plane, etc.

As illustrated in FIG. 5, the vehicles 502 and 512a-512c are traveling on a road 510. Further, the vehicles 512a-512c may include sensors (not shown in FIG. 5) that may interfere with operation of the sensor 506 of the vehicle 502. Various scenarios to reduce interference between such sensors and the sensor 506 in accordance with the present disclosure are presented below.

In an example scenario, the vehicle 512b may also include a backward facing sensor (not shown) that is directed towards the sensor 506. In this scenario, for example, the radar planning system may assign different radar channels to the potentially interfering radars. The radar planning system may communicate the radar channel assignments to the respective vehicles, along with instructions to operate the radar units based on the channel assignments. Each vehicle may responsively adjust the channel of operation for the respective sensor 506 to reduce interference between the sensor of the vehicle 512b and the sensor 506 of the vehicle 502. Other examples are possible as well.

In another scenario, the vehicle 512c may also include a backward facing sensor (not shown) that is directed towards the sensor 506. In this scenario, the sensor of the vehicle 512c may receive signals from the sensor 506 that interfere with the sensor of the vehicle 512c. Accordingly, in the scenario, the vehicle 502 may reduce power of the signal from the sensor 506 such that the signal may not significantly interfere with the sensor of the vehicle 512c after traversing a given distance to the vehicle 512c. Other scenarios are possible as well in accordance with the present disclosure.

Figure 6:
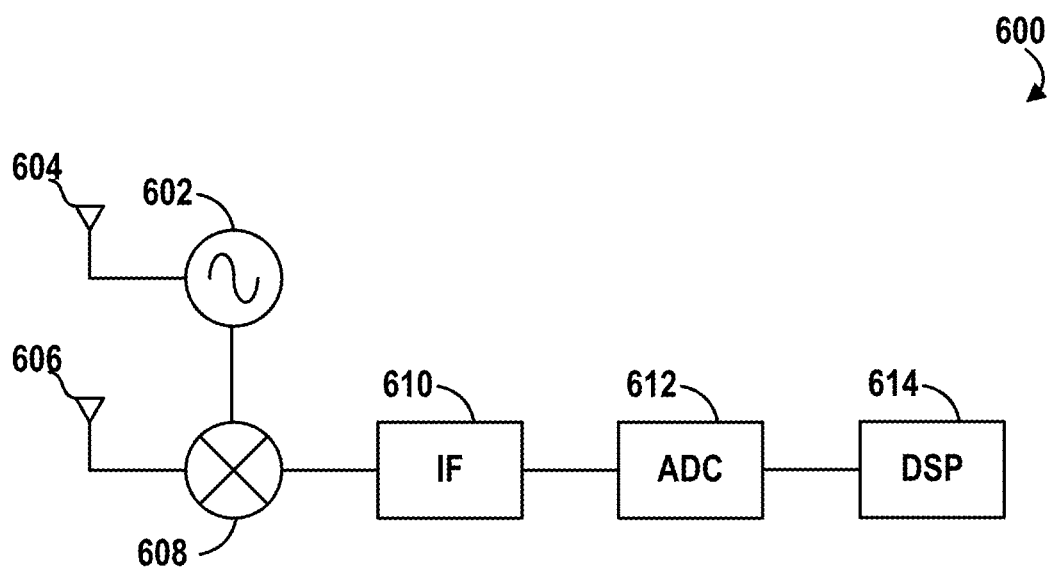
FIG. 6 is a simplified block diagram of a sensor, according to an example embodiment.

FIG. 6 is a simplified block diagram of a sensor 600, according to an example embodiment. The sensor 600, for example, may include a linearly frequency modulated wave (LFM) RADAR. The configuration shown in FIG. 6 is one example of possible circuitry for a sensor 600. The sensor 600 includes a local oscillator 602, a transmitter 604, a receiver 606, a mixer 608, an intermediate frequency (IF) filter 610, an analog-to-digital converter (ADC) 612, and a digital signal processor (DSP) 614. The sensor 600, for example, may be similar to the radar unit 206 of the vehicle 200.

It is noted that the blocks 602-614 are for exemplary purposes only. In some examples some of the blocks in the sensor 600 may be combined or divided into other blocks. For example, FIG. 6 shows a single transmitter 604 and receiver 606. In some embodiments the sensor 600 may include multiple transmitters and/or receivers. In one example configuration, the sensor 600 may include 2 transmitters and 4 receivers. In another example configuration, the sensor 600 may include 4 transmitters and 8 receivers. Other examples are possible as well. Further, for example, the receiver 606 may include the mixer 608.

The local oscillator 602 may include any oscillator (e.g., coherent oscillator, etc.) that may be configured to output a linear frequency ramp wave. The wave may be utilized by the transmitter 604 (e.g., transmitter antenna) to radiate electromagnetic (EM) radiation towards an environment of the sensor 600. By way of example, the local oscillator 602 may be configured to sweep a particular bandwidth (e.g., 76 Ghz-77 Ghz) at a periodic rate to provide the wave to the transmitter 604. In some examples, the local oscillator 602 may be coupled to a processor (not shown) to control the local oscillator 602. The processor may adjust the frequency, power, and/or other parameters of the local oscillator 602 based on a channel assignment of the respective sensor 600.

The EM radiation may reflect off one or more objects in the environment, and the reflected EM radiation may be received by the receiver 606. In some examples, the transmitter 604 and the receiver 606 may include any antenna such as a dipole antenna, a waveguide antenna, a waveguide array antenna, or any other type of antenna.

The signal from the receiver 606 may be received by the mixer 608 along with a signal from the local oscillator 602. The mixer 608 may include any electronic mixer device such as an unbalanced crystal mixer, a point-contact crystal diode, a schottky-barrier diode or any other mixer. The mixer 608 may be configured to provide an output that includes a mixture of the frequencies in the input signals such as a sum of the frequencies or a difference of the frequencies.

The signal from the mixer 608 may be received by the IF filter 610 that is configured to filter a desired intermediate frequency out of the mixture frequencies from the mixer 608. In some examples the IF filter 610 may include one or more bandpass filters. The IF filter 610 may have a particular bandwidth associated with a resolution of the sensor 600. The ADC 612 may then receive the signal from the IF filter 610 and provide a digital representation of the IF filter 610 output to the DSP 614.

The DSP 614 may include any digital signal processing device or algorithm to process the data from the ADC 612 for determination of range, angle, or velocity of the one or more objects in the environment of the sensor 600. The DSP 614, for example, may include one or more processors. In one example, the DSP 614 may be configured to determine a Binary Phase-Shift keying (BPSK) scheme of the signal received by the receiver 606. In this example, the DSP 614 may identify the source of the received EM radiation. For example, the BPSK scheme of the transmitted EM radiation by the transmitter 604 may be compared with the BPSK scheme of the EM radiation received by the receiver 606.

Figure 7:
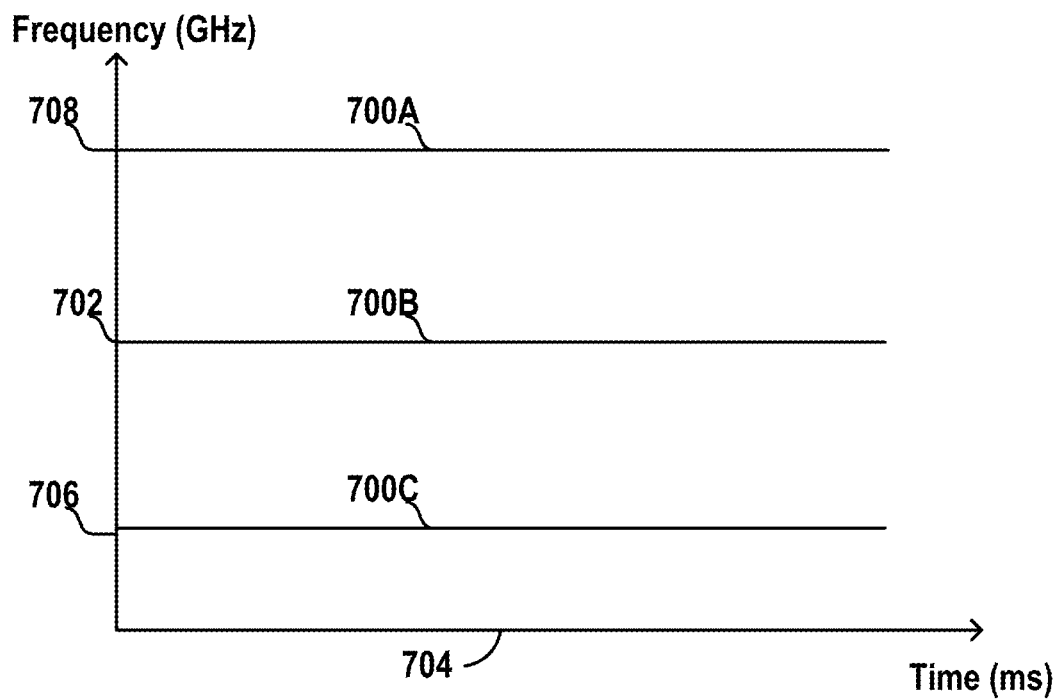
FIG. 7 illustrates example radar channels of a traditional radar system.

FIG. 7 illustrates example radar channels of a traditional radar system. FIG. 7 may shown three example radar channels 700A-700C upon which radar units may transmit radar signals. The three example radar channels 700A-700C may exist in a bandwidth between frequencies 706 and 708. The minimum frequency 706 and the maximum frequency 708 could, for example, span a frequency range of 76 GHz to 77 GHz, part of this frequency range, or some other frequency range, with a center frequency 702 at 76.5 GHz, as an example. In the example shown in FIG. 7, each radar channel is assigned a specific frequency of operation across all time 704.

Each radar channel may have an associated bandwidth. Thus, for a given radar bandwidth defined by the minimum frequency 706 and the maximum frequency 708, the total number of channels that may operate in the radar bandwidth is equal to the total radar bandwidth divided by the bandwidth of a single channel. For example, if the radar bandwidth is equal to 1 GHz and each channel has a 20 MHz bandwidth, the radar bandwidth may support 50 channels. Therefore, the radar system of this example may be limited to 50 radar units within a given region, in order to mitigate potential interference.

In order to support more radar units in a given region, a radar system may use different techniques to support more radar channels in a given bandwidth. As previously discussed, different modulations, signaling modes, and other techniques may be used to increase the number of channels that a bandwidth can support. Thus, the present radar system uses different radar signaling than shown in FIG. 7, to support more radar units operating simultaneously in a given region.

Figure 8:
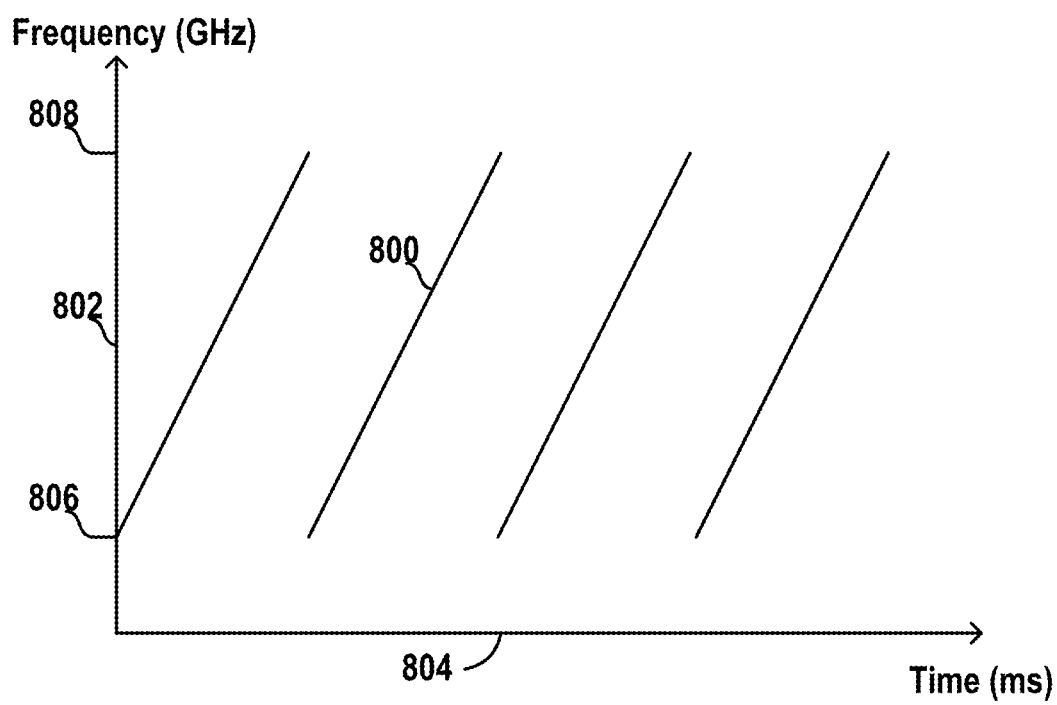
FIG. 8 illustrates a modulation pattern of electromagnetic (EM) radiation from a sensor, according to an example embodiment.

FIG. 8 illustrates a modulation pattern 800 of electromagnetic (EM) radiation for a given channel from a sensor, according to an example embodiment. The modulation pattern 800 may correspond to the linear frequency modulated ramp wave provided by a local oscillator in the sensor similar to the local oscillator 602 of the sensor 600. FIG. 8 shows the modulation pattern 800 along a frequency axis 802 (vertical axis) and a time axis 804 (horizontal axis). The modulation pattern 800 may correspond to a single channel for a radar system.

Thus, for example, the EM radiation may have a continuously changing frequency between a minimum frequency 806 and a maximum frequency 808. The minimum frequency 806 and the maximum frequency 808 could, for example, span a frequency range of 76 GHz to 77 GHz, part of this frequency range, or some other frequency range. In the example shown in FIG. 8, the modulation pattern 800 corresponds to a linear ramp pattern. However, in other examples, the shape of the modulation pattern 800 may correspond to any other shape such as a sawtooth pattern, a square wave pattern, a sine wave pattern, triangular pattern, or any other shape.

Additionally, the modulation pattern 800 is shown with a linear ramp between a first frequency 806 and a second frequency 808. When the linear ramp reaches the second frequency 808, the linear ramp may begin again at the first frequency 806. In some examples, the linear ramp may begin again at approximately the time right after the linear ramp reaches the second frequency 808. In some other examples, there may be a delay of a predetermined amount of time between when the linear ramp reaches the second frequency 808 and when it starts transmitting again at the first frequency 806. Thus, for the duration of the predetermined amount of time, the system may not transmit any signal at all.

In an example operation of a sensor, such as the sensor 600, the EM radiation having the modulation pattern 800 may be transmitted by a transmitter (e.g., the transmitter 604) and a reflection of the modulation pattern 800 may be received by a receiver (e.g., the receiver 606). By comparing the modulation pattern 800 of the transmitted wave with a modulation pattern of the reflected wave distances and velocities of objects in the environment of the sensor may be determined. For example, the time offset between the transmitted wave and the received wave may be utilized to determine the distance (e.g., range) to the object. Further, for example, a change in the slope of the modulated pattern 800 may be utilized to determine the velocity of the object (e.g., Doppler velocity, etc.) relative to the sensor.

Figure 9A:
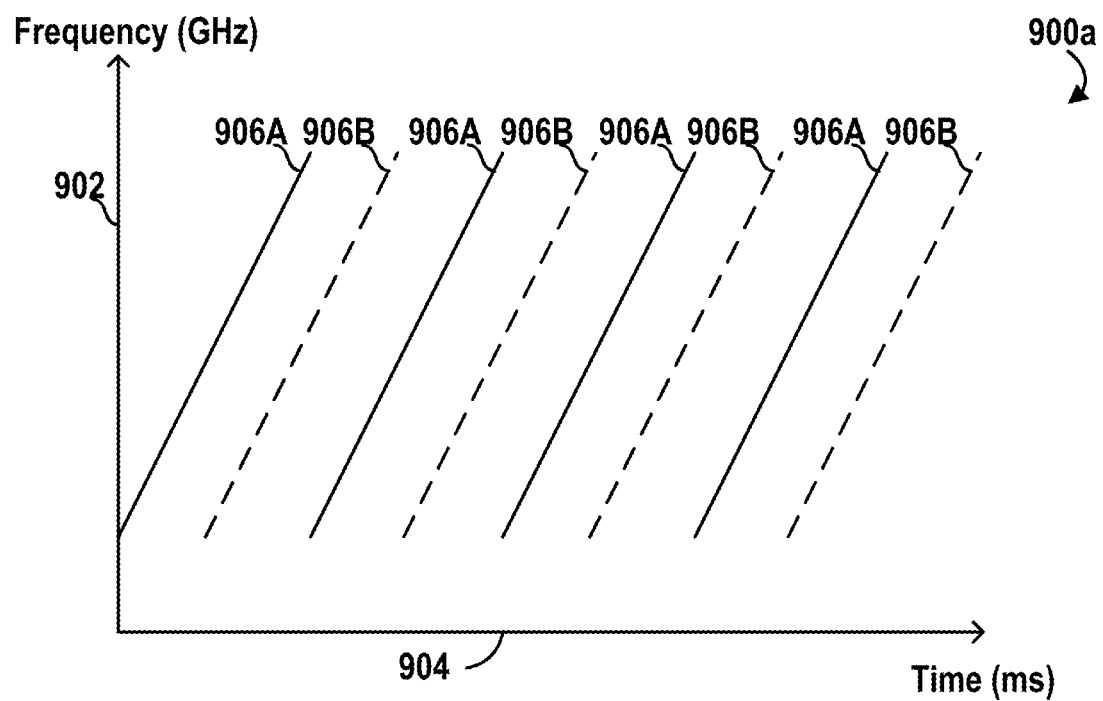
FIG. 9A illustrate an example scenario for assigning channels, in accordance with at least some embodiments herein.
Figure 9B:
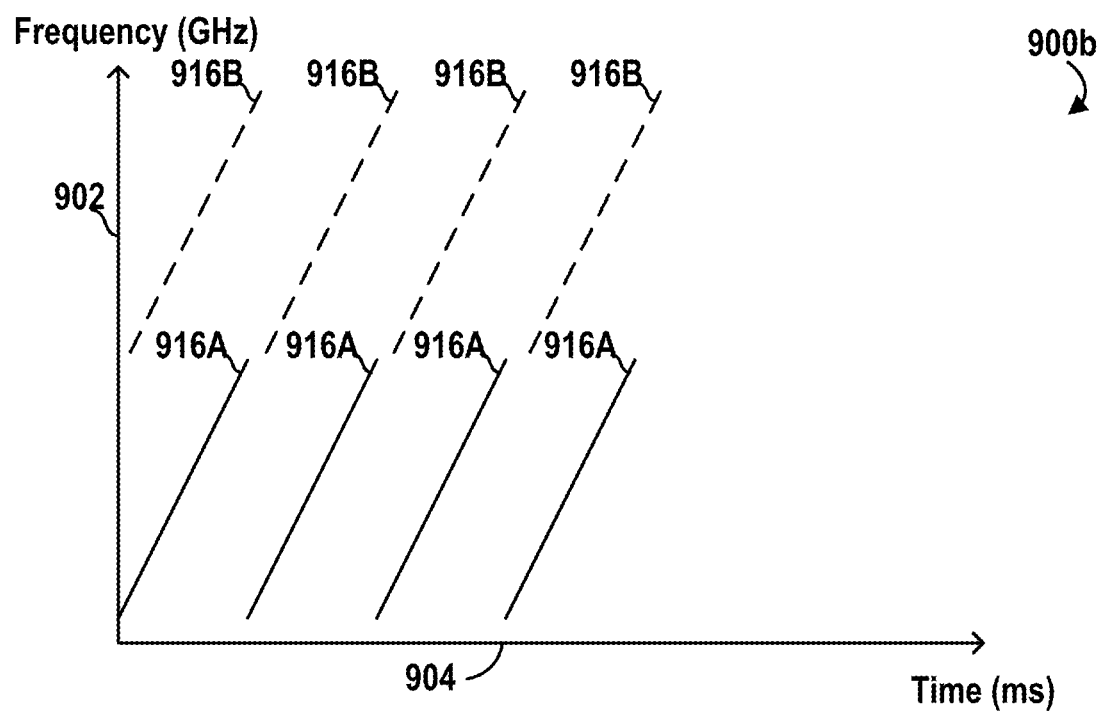
FIG. 9B illustrate another example scenario for assigning channels, in accordance with at least some embodiments herein.

FIGS. 9A and 9B illustrate two example scenarios 900*a* and 900*b* for multiple channels of the transmission of radar signals described with respect to FIG. 8. The scenarios 900*a* and 900*b* present two example channels along a frequency axis 902 and a time axis 904 that are similar, respectively, to the frequency axis 802 and the time axis 804 of FIG. 8. In FIGS. 9A and 9B, first channel 906A and 916A may correspond to modulated patterns of EM radiation from a first sensor, and second channel 906B and 916B may correspond to modulated patterns of EM radiation from a second sensor. The scenarios 900A and 900B present various adjustments of the corresponding modulation patterns to reduce interference in accordance with the present disclosure.

In scenario 900A of FIG. 9A, the second channel 906B upon which the second sensor transmits may be offset in time from the first channel 906A. For example, the time offset may locate transmissions on the second channel 906B in the middle of the time period between consecutive transmissions by the first channel 906A. Accordingly, a filter such as the IF filter 610 of the sensor 600 may be able to resolve the desired channel of the two channels at each respective radar unit. Thus, each radar unit may not have interference from the other radar unit operating on the channel. In practice, there may be more than two channels, and the channels may be more tightly spaced than shown in 900A.

The radar planning system may be able to determine when two channels are too closely spaced for transmissions by two radar units on the two channels to not interfere with each other. In some instances, adjacent channels may cause interference based on the linear frequency ramps of the two channels being too close together. Because radar signals take time to propagate, two radars that are located sufficiently far from each other may interfere with each other when operating on adjacent channels due to objects causing reflections being further away from the second vehicle. That is, interference may be caused when an object reflects a radar signal transmitted on a first channel, and the second vehicle receives the reflected signal and incorrectly assumes it was transmitted on the second channel on which the second radar was operating. In practice, this may manifest as the second vehicle making an incorrect detection based on the received signal on the incorrect channel. Therefore, the radar planning system may determine situations where adjacent channels may cause interference and assign radar channels to minimize potential interference.

In scenario 900B of FIG. 9B, the second channel 916B upon which the second sensor transmits may be offset in frequency from the first channel 916A. For example, the frequency offset may locate transmissions on the second channel 916B in a different range of frequencies from transmissions on the first channel 916A. Accordingly, a filter such as the IF filter 610 of the sensor 600 may be able to resolve the desired channel of the two channels at each respective radar unit. Thus, each radar unit may not have interference from the other radar unit operating on the channel. In practice, there may be more than two channels, and the channels may more tightly spaced than shown in 900A. Scenarios 900A and 900B of FIGS. 9A and 9B are illustrated for exemplary purposes only. Other scenarios are possible for adjusting the modulation pattern of a sensor to reduce the interference in accordance with the present disclosure. Additionally, in some examples, the time division shown in 900A and the frequency division shown in 900B may be combined to form even more channels.

Figure 10:
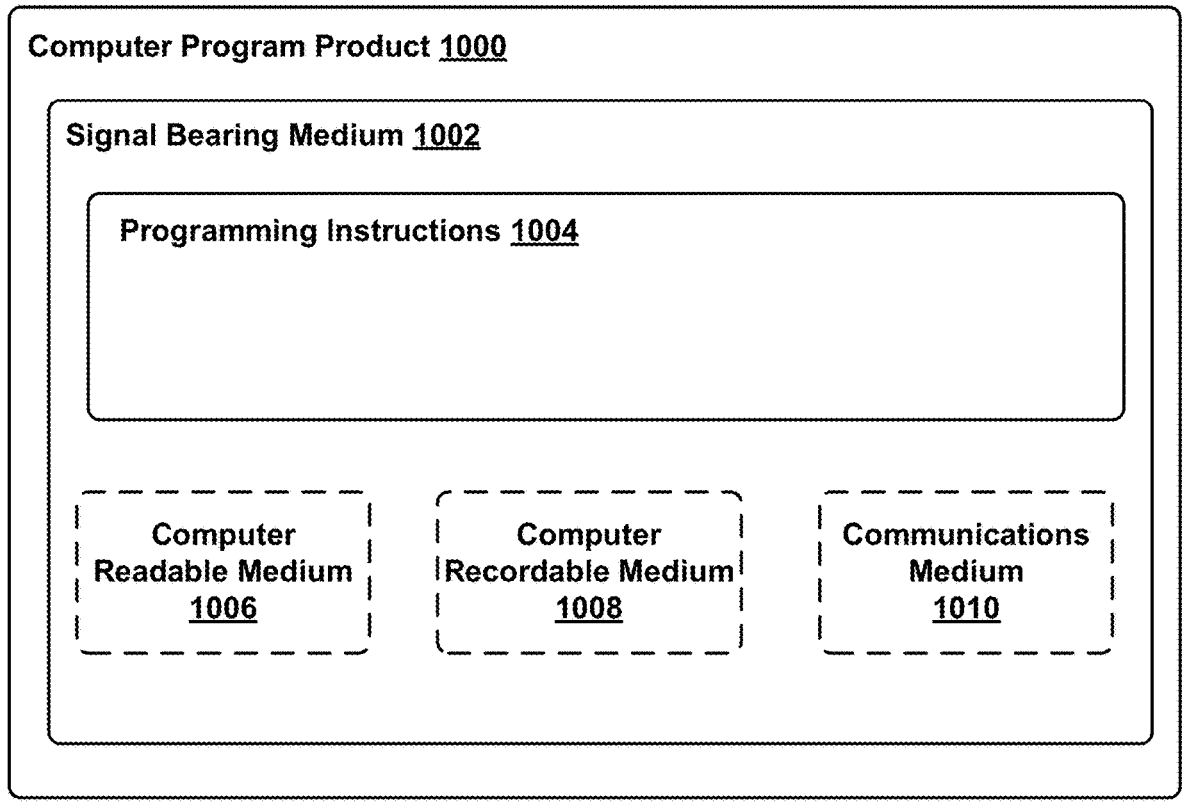
FIG. 10 depicts an example computer readable medium configured according to an example embodiment.

FIG. 10 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., methods 400, etc.) may be implemented by computer program instructions encoded on a computer readable storage media in a machine-readable format, or on other media or articles of manufacture (e.g., instructions 216 of the vehicle 200, instructions 312 of the computing device 304, etc.). FIG. 10 is a schematic illustrating a conceptual partial view of an example computer program product that includes a computer program for executing a computer process on a computing device, such as on a radar planning system, arranged according to at least some embodiments disclosed herein.

In one embodiment, the example computer program product 1000 is provided using a signal bearing medium 1002. The signal bearing medium 1002 may include one or more programming instructions 1004 that, when executed by one or more processors may provide functionality or portions of the functionality described above with respect to FIGS. 1-9. In some examples, the signal bearing medium 1002 may be a computer-readable medium 1006, such as, but not limited to, a hard disk drive, a Compact Disc (CD), a Digital Video Disk (DVD), a digital tape, memory, etc. In some implementations, the signal bearing medium 1002 may be a computer recordable medium 1008, such as, but not limited to, memory, read/write (R/W) CDs, R/W DVDs, etc. In some implementations, the signal bearing medium 1002 may be a communication medium 1010 (e.g., a fiber optic cable, a waveguide, a wired communications link, etc.). Thus, for example, the signal bearing medium 1002 may be conveyed by a wireless form of the communications medium 1010.

The one or more programming instructions 1004 may be, for example, computer executable and/or logic implemented instructions. In some examples, a computing device may be configured to provide various operations, functions, or actions in response to the programming instructions 1004 conveyed to the computing device by one or more of the computer readable medium 1006, the computer recordable medium 1008, and/or the communications medium 1010.

The computer readable medium 1006 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server, or a distributed cloud computing network.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A radar planning system comprising:
a communication interface configured to communicate with a plurality of vehicles;
a memory configured to store data related to the plurality of vehicles, wherein the data includes vehicle position data; and
a processing system configured to:
determine potential radar interference between first and second radar units associated with at least one vehicle in communication with the radar planning system,
determine, based on the potential radar interference, first and second radar channel assignments, wherein the first radar channel assignment comprises a first sequence of channels for transmission by the first radar unit, and the second radar channel assignment comprises a second sequence of channels for transmission by the second radar unit, and
provide the determined first and second radar channel assignments to the at least one vehicle in communication with the radar planning system.

2. The radar planning system of claim 1, wherein the memory is further configured to store sensor orientation data for the plurality of vehicles.

3. The radar planning system of claim 2, wherein the processing system is further configured to determine potential radar interference based on both an orientation of a given sensor and a position of a vehicle of the plurality of vehicles.

4. The radar planning system of claim 3, wherein the processing system is further configured to determine potential radar interference based on both the orientation of the given sensor and an orientation of a second sensor.

5. The radar planning system of claim 1, wherein the processing system is further configured to provide a time synchronization signal to the plurality of vehicles by way of the communication interface.

6. The radar planning system of claim 1, wherein the first and second radar channel assignments are associated with transmission during a first block of time, and wherein the processing system is further configured to:
determine, based on the potential radar interference, third and fourth radar channel assignments, wherein the third radar channel assignment comprises a third sequence of channels for transmission by the first radar unit during a second block of time, and the fourth radar channel assignment comprises a fourth sequence of channels for transmission by the second radar unit during the second block of time; and
provide the determined third and fourth radar channel assignments to the at least one vehicle in communication with the radar planning system.

7. A method comprising:
determining, potential radar interference between first and second radar units associated with at least one vehicle of a plurality of vehicles in communication with a radar planning system by way of a communication interface;
determining, based on the potential radar interference, first and second radar channel assignments, wherein the first radar channel assignment comprises a first sequence of channels for transmission by the first radar unit, and the second radar channel assignment comprises a second sequence of channels for transmission by the second radar unit; and
providing the determined first and second radar channel assignments to the at least one vehicle in communication with the radar planning system.

8. The method of claim 7, further comprising:
receiving location data from the at least one vehicle, and
wherein the determining of the potential radar interference is based on the location data.

9. The method of claim 7, further comprising determining potential radar interference based on stored sensor orientation data stored in a memory of the radar planning system.

10. The method of claim 9, wherein the processing system is further configured to determine potential radar interference based on both the orientation of the given radar unit and an orientation of a second radar unit.

11. The method of claim 7, further comprising providing a time synchronization signal to the plurality of vehicles by way of the communication interface.

12. The method of claim 7, wherein the first and second radar units are both located on a vehicle of the plurality of vehicles.

13. The method of claim 7, wherein the first and second radar units are located on two different vehicles of the plurality of vehicles.

14. The method of claim 7, further comprising determining potential radar interference based on:
a location of a first vehicle,
a location of a second vehicle,
an orientation of a radar unit of the first vehicle, and
an orientation of a radar unit of the second vehicle.

15. The method of claim 7, further comprising determining radar channel assignments for the first and second radar units wherein the respective radar channel assignments are different channel assignments.

16. The method of claim 15, further comprising determining radar channel assignments for the first and second radar units wherein the respective radar channel assignments are assigned so that the channel assignments are non-adjacent channels.

17. A non-transitory computer readable medium having stored thereon executable instructions that, upon execution by a computing device, cause the computing device to perform functions comprising:
determining potential radar interference between first and second radar units associated with at least one vehicle of a plurality of vehicles in communication with a radar planning system by way of a communication interface;
determining, based on the potential radar interference, first and second radar channel assignments, wherein the first radar channel assignment comprises a first sequence of channels for transmission by the first radar unit, and the second radar channel assignment comprises a second sequence of channels for transmission by the second radar unit; and
providing the determined first and second radar channel assignments to the at least one vehicle in communication with the radar planning system.

18. The non-transitory computer readable medium of claim 17, further comprising instructions for:
receiving location data from the least one vehicle and wherein determining potential radar interference is based on the location data.

19. The non-transitory computer readable medium of claim 17, further comprising instructions for determining potential radar interference based on both the orientation of the given radar unit and an orientation of a second radar unit.

20. The non-transitory computer readable medium of claim 17, further comprising instructions for determining radar channel assignments for the first and second radar units wherein the respective radar channel assignments are different channel assignments.

\* \* \* \* \*